US012687261B2

(12) United States Patent　　　(10) Patent No.: US 12,687,261 B2

Rau　　　(45) Date of Patent: Jul. 21, 2026

(54) SHUT-OFF VALVE, AND HYDROGEN TANK SYSTEM COMPRISING SHUT-OFF VALVE

(71) Applicant: Robert Bosch GmbH, Stuttgart (DE)

(72) Inventor: Andreas Rau, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 70 days.

(21) Appl. No.: 18/698,553

(22) PCT Filed: Sep. 26, 2022

(86) PCT No.: PCT/EP2022/076680

§ 371 (c)(1),
(2) Date: Apr. 4, 2024

(87) PCT Pub. No.: WO2023/072505

PCT Pub. Date: May 4, 2023

(65) Prior Publication Data

US 2025/0237358 A1　　Jul. 24, 2025

(30) Foreign Application Priority Data

Oct. 27, 2021　(DE) ..................... 10 2021 212 129.2

(51) Int. Cl.
F17C 13/04　　(2006.01)
F16K 31/40　　(2006.01)

(52) U.S. Cl.
CPC ............ F17C 13/04 (2013.01); F16K 31/406 (2013.01); *F17C 2201/0104* (2013.01); (Continued)

(58) Field of Classification Search
CPC ........................ F17C 13/04; F17C 2205/0326
See application file for complete search history.

(56) References Cited

U.S. PATENT DOCUMENTS 3,100,103 A * 8/1963 Bullard ................. F16K 31/408
　　　　　　　　　　　　　　　　　　　　251/38
6,675,831 B2 1/2004 Sakaguchi et al.
　　　　　　　　(Continued)

FOREIGN PATENT DOCUMENTS

DE　　102018221600 A1　6/2020
JP　　H02118282 A　　5/1990
　　　　　　(Continued)

OTHER PUBLICATIONS

Translation of International Search Report for Application No. PCT/EP2022/076680 dated Feb. 1, 2023 (2 pages).

*Primary Examiner* — Reinaldo Sanchez-Medina

*Assistant Examiner* — Nicole Gardner

(74) *Attorney, Agent, or Firm* — Michael Best & Friedrich LLP

(57) ABSTRACT

A shut-off valve for hydrogen tank systems includes a main valve having a reciprocally movable valve member which is formed of one or more pieces and interacts at one end with a valve seat and delimits at another end a control chamber. A control valve has a reciprocally movable control valve piston for opening and closing a housing-side of a control valve seat via which the control chamber can be connected to at least one pressure-regulating region. A solenoid acts on a first armature, which is connected to the control valve piston or forms the control valve piston, and a second armature, which is connected to the valve member of the main valve.

14 Claims, 1 Drawing Sheet

(52) U.S. Cl.
CPC ................. *F17C 2205/0323* (2013.01); *F17C 2205/0394* (2013.01); *F17C 2221/012* (2013.01); *F17C 2270/0168* (2013.01); *F17C 2270/0184* (2013.01)

(56) References Cited

U.S. PATENT DOCUMENTS

| | | | |
|---|---|---|---|
| 8,646,748 B2 * | 2/2014 | Alberini | F02M 21/0239 |
| | | | 251/30.02 |
| 2014/0042352 A1 | 2/2014 | Zieger | |
| 2014/0239207 A1 | 8/2014 | Ninomiya et al. | |
| 2015/0184805 A1 | 7/2015 | Lee | |
| 2018/0038507 A1 | 2/2018 | Ninomiya et al. | |

FOREIGN PATENT DOCUMENTS

| | | | |
|---|---|---|---|
| JP | 2009222174 A | 10/2009 | |
| WO | 2020158728 A1 | 8/2020 | |

* cited by examiner

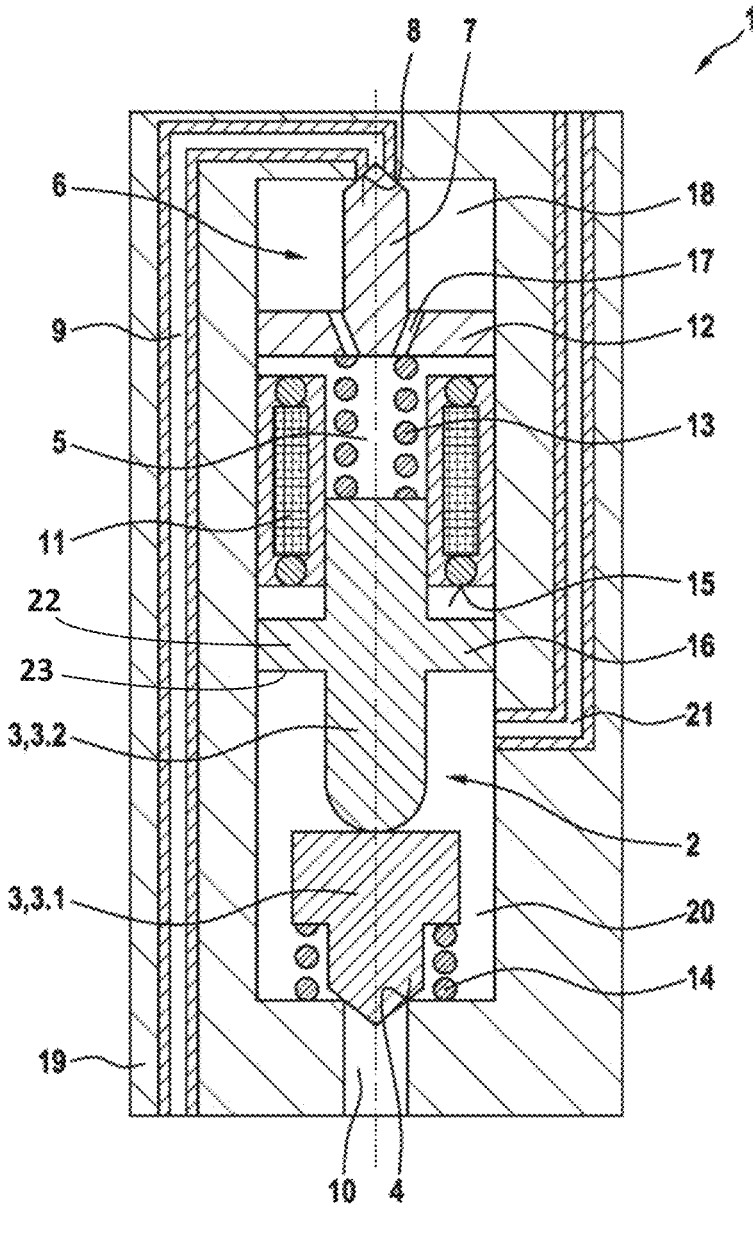

SHUT-OFF VALVE, AND HYDROGEN TANK SYSTEM COMPRISING SHUT-OFF VALVE

BACKGROUND

The invention relates to a shut-off valve for hydrogen tank systems. The invention also relates to a hydrogen tank system comprising a shut-off valve according to the invention.

Hydrogen tank systems for motor vehicles or mobile hydrogen tank systems that serve to supply hydrogen to fuel cells or internal combustion engines are known. In the event of a failure, for example a line breakage, or an accident, the individual containers of a hydrogen tank system must each be closable by means of a shut-off valve to prevent uncontrolled leakage of hydrogen. The shut-off valves used must therefore be configured as non-powered self-closing valves.

From the prior art, non-powered, self-acting shut-off valves are known that comprise a main valve controlled indirectly via a control valve. The control valve typically has a control valve seat located in a closing pressure area of the main valve, and a control valve piston, which can be lifted off the control valve seat by means of magnetic force. The closing pressure area on the main valve forming the control valve seat delimits a so-called control chamber. At the opposite end, the main valve with its opening pressure areas projects into the so-called valve chamber, which is fluidically connected to a pressure accumulator. The control chamber and the valve chamber are pneumatically separated from one another by a throttle point. Opening the control valve relieves the control chamber. This also relieves the valve member of the main valve. The main valve can then be opened by means of the spring force of a spring or the magnetic force of a magnetic actuator. The main valve is usually closed by a closing spring force. However, the disadvantage of these shut-off valves is generally an increased installation space requirement, as large strokes are to be realized, which in turn require large and/or multiple magnetic actuators, so that the installation space requirements and costs increase.

However, the space available in mobile hydrogen tank systems is limited. This applies in particular to hydrogen tank systems with pressurized gas tanks having a cylinder neck in which the shut-off valve is to be integrated. The cylinder neck represents the most stable and thus the safest installation location, but requires a shut-off valve that has a low installation space requirement.

Also known from the prior art are injection valves for internal combustion engines, which are indirectly controlled by means of a control valve and require comparatively little installation space, as the control valve and main valve may have different stoke sizes and consequently the magnetic actuator for the control valve may be smaller in size. Opening the control valve causes a pressure drop in a control chamber, which ultimately leads to the main valve opening. In the fully open state, the valve member of the main valve and the control valve piston are surrounded by high pressure, so that only the spring force of a spring acting in the closing direction is needed for self-closing. After that, however, the main valve can only be opened again when the pressure in the line system has dropped due to a load reduction, because only then is a lower pressure level available again for the control chamber. This continuous opening and closing leads to increased wear of the typical plastic or elastomeric seats in the hydrogen region.

SUMMARY

The object of the present invention is therefore to specify a shut-off valve for a hydrogen tank system that is miniaturized to the extent that it can be integrated into the cylinder neck of a pressurized gas tank of a hydrogen tank system and is at the same time as low-wear as possible.

To achieve the object, the shut-off valve having the features of the disclosure is specified. Also disclosed is a hydrogen tank system comprising at least one shut-off valve according to the invention.

The proposed shut-off valve for hydrogen tank systems comprises:

- a main valve having a reciprocally movable valve member which is formed of one or more pieces and interacts at one end with a valve seat and delimits a control chamber at the other end,
- a control valve having a reciprocally movable control valve piston for opening and closing a housing-side control valve seat via which the control chamber can be connected to at least one pressure-regulating region, and
- a solenoid for acting on a first armature, which is connected to the control valve piston or forms the control valve piston, and a second armature, which is connected to the valve member of the main valve.

For the proposed shut-off valve, the main valve is opened by opening the control valve. When the control valve is opened, the control chamber is connected to a pressure-regulating region, which leads to a pressure drop in the control chamber. The pressure drop in the control chamber causes the main valve to open, such that hydrogen under pressure flows out of a storage volume of the hydrogen tank system via the valve seat of the main valve. The magnetic force of the solenoid assists in opening the main valve. With the main valve fully open, the magnetic force creates a holding force, which in the event of a complete pressure equalization at the valve member of the main valve, keeps it securely open against a spring force acting on the valve member. In this way, a constant opening and closing of the main valve—as described at the beginning in connection with the prior art—can be effectively avoided.

Accordingly, the opening of the main valve is substantially pressure-controlled. The magnetic force of the solenoid only has a supporting effect. However, in the event of a complete pressure equalization, the main valve can also be opened solely via the magnetic force of the solenoid.

However, the magnetic force of the solenoid is primarily used to open the control valve and only partially to support the opening movement of the main valve. The solenoid may be designed to be comparatively small with a correspondingly small seat diameter of the control valve seat and due to the pneumatic opening force acting on the valve member of the main valve. This in turn allows for miniaturization of the proposed shut-off valve.

According to a preferred embodiment of the invention, the control chamber is fluidically throttling connected to a valve chamber of the main valve. If the power supply to the solenoid is switched off to close the shut-off valve, the control valve closes first. As a result, the connection between the control chamber and the pressure-regulating region is disconnected and the control chamber fills with gas from the valve chamber via the fluidic throttling connection. This leads to a pressure increase in the control chamber, which ensures a secure closing of the main valve.

In an advantageous configuration of the proposed shut-off valve, a sealing element is provided in a guide area of the valve member of the main valve between the control chamber and the valve chamber. A fluidic throttling connection is then preferably established via a defined throttle point, for example via a throttle bore connecting the control chamber to the valve chamber. The inflow of gas into the control chamber can be optimally controlled via a defined throttle point. In a design without a sealing element, the guide area itself can also be designed as a throttle gap.

Preferably, the pressure-regulating region of the control valve is connected to a pressure-regulating region of the main valve, such that at least approximately the same pressure prevails in both pressure-regulating regions. When the control valve is open, i.e., when the pressure in the control chamber drops and the pressure in the pressure-regulating regions rises, pressure equalization is achieved at the valve member of the main valve, such that the main valve can be opened with the support of the magnetic force of the solenoid.

Preferably, the control valve piston of the control valve is acted upon by the spring force of a spring in the direction of the control valve seat. The spring force of the spring can be used to reset the control valve piston or close the control valve. The spring, formed of one or more pieces, can be supported at the other end of the main valve on the valve member, such that it is preloaded in the direction of the valve seat of the main valve. The one spring can therefore be used to ensure that the shut-off valve self-closes in the event of a defect and/or accident.

Furthermore, it is proposed that the valve member, formed of one or more pieces, of the main valve is applied with the spring force of a spring in the opening direction. This is particularly advantageous for a multi-piece design of the valve member, as the spring force of the further spring can be used to ensure that the multiple valve member pieces behave like one valve member. In addition, the opening pressure difference at the main valve can be set via the opening spring force and the seat diameter of the main valve. If the actual pressure difference is greater than the opening pressure difference, the main valve remains closed. This means that in the case of a valve member of the main valve having multiple pieces, in particular two pieces, the opening spring force on the main valve delimits a pressure surge discharged into the system, such that the component load in the system decreases, resulting in cost savings in the overall system.

Preferably, the valve member of the main valve comprises a first valve member that interacts with the valve seat, as well as a further valve member that delimits the control chamber. That is to say, the valve member is configured in multiple pieces. Compared to the one-piece design, the multi-piece design has the advantage that de-axialization problems caused by manufacturing and/or assembly tolerances can be easily compensated. For example, the valve member may be guided axially, but the guide may be configured on a component other than the valve seat. If the guide and the valve seat are not arranged exactly coaxially, a one-piece valve member may have an oblique position, such that the shut-off valve no longer closes tightly. The multi-piece design, on the other hand, allows the lack of coaxiality to be compensated by a radial displacement of the two valve member pieces in relation to each other.

The valve member piece delimiting the control chamber is preferably guided over the aforementioned guide area in a reciprocally movable manner. The valve member is therefore guided via the valve member piece remote from the seat, such that the advantages of the multi-piece design are particularly evident.

Alternatively or additionally, it is proposed that the valve member piece delimiting the control chamber has an annular collar that interacts with a stop. This measure may limit the stroke of the main valve.

In a particularly advantageous configuration, the second armature, i.e., the armature of the main valve, forms the valve member piece delimiting the control chamber and/or the stroke stop.

Furthermore, it is proposed that the control valve piston and/or the first armature, i.e., the armature of the control valve, delimit or delimits the control chamber and that a connection between the control chamber and a control valve chamber is established via at least one flow-through opening configured in the control valve piston and/or in the armature. A permanent connection between the control chamber and the control valve chamber can be ensured via the at least one flow-through opening, regardless of the current position of the control valve piston or the armature.

Advantageously, the first armature, i.e., the armature of the control valve, is designed as a flat armature or has a portion configured as a flat armature. In the design as a flat armature, the control valve and consequently the shut-off valve can be designed to be particularly space-saving or installation space-saving.

Furthermore, the second armature, i.e., the armature of the main valve, is preferably designed as a plunge armature or has a portion designed as a plunge armature. In this embodiment, the armature is guided at the same time.

In order to further reduce the installation space requirements, it is proposed that the main valve and the control valve are arranged coaxially. That is, the longitudinal axes of the control valve piston and the valve member coincide. The opening movements of the control valve piston and valve member are in opposite directions.

Alternatively or additionally, it is proposed that the main valve and the control valve are accommodated in a common housing. This measure can also further reduce the installation space requirement of the shut-off valve. In addition, the assembly of the shut-off valve is facilitated because the shut-off valve may be integrated as a pre-assembled unit in a pressurized gas tank, preferably in a cylinder neck of a pressurized gas tank of the hydrogen tank system.

Furthermore, a gas line preferably opens into the valve chamber of the main valve, via which the valve chamber can be connected to a storage volume of a pressurized gas tank of the hydrogen tank system. When the main valve is open, a connection may thus be established between the pressure-regulating regions and the storage volume of the pressurized gas tank.

The hydrogen tank system proposed for solving the task mentioned above further comprises at least one pressurized gas tank and a shut-off valve according to the invention. The low installation space requirement of the shut-off valve according to the invention allows the shut-off valve to be integrated into the pressurized gas tank so that it can be individually shut off.

Preferably, the shut-off valve is therefore integrated into the pressurized gas tank, and also preferably in a cylinder neck of the pressurized gas tank. The shut-off valve is particularly secure in the cylinder neck, as the neck is the most stable part of the pressurized gas tank. It is also possible that the shut-off valve is only partially integrated into the cylinder neck.

The proposed hydrogen tank system can be used in particular in a fuel cell vehicle or in a vehicle with hydrogen combustion.

BRIEF DESCRIPTION OF THE DRAWINGS

A preferred embodiment of the invention is explained in further detail below with reference to the accompanying drawing. The drawing shows a schematic longitudinal section through a shut-off valve according to the invention.

DETAILED DESCRIPTION

The shut-off valve 1 according to the invention shown in the FIGURE comprises a main valve 2 and a control valve 6, which are arranged coaxially in a common housing 19.

The main valve 2 comprises a multi-piece valve member 3 comprising a first valve member 3.1 that interacts with a valve seat 4, and a second valve member piece 3.2 that delimits a control chamber 5. The second valve member piece 3.2 is guided via a guide region 23 in a reciprocally movable manner and has an annular collar 16 outside the guide area 23 that interacts with a stop 15 to limit the stroke. The annular collar 16 is designed in such a way that it serves as an armature 22, which magnetically assists the opening of the main valve 2 and keeps the fully open main valve 2 securely open. The end of the second valve member piece 3.2 facing the first valve member piece 3.1 is spherically shaped, such that an articulated connection to the first valve member 3.1 can be established to compensate for any manufacturing and/or assembly tolerances. The first valve member piece 3.1 is preloaded in the direction of the second valve member piece 3.2 by means of the spring force of a spring 14.

The control valve 6 comprises a reciprocally moveable control valve piston 7 that interacts at one end with a control valve seat 8 and is connected at the other end to an armature 12 designed as a flat armature. A solenoid 11 is provided for acting on the armature 12. When the solenoid 11 is powered, a magnetic field is formed whose magnetic force pulls the armature 12 including the control valve piston 7 in the direction of the solenoid 11. The control valve seat 8 opens, such that a connection between the control chamber 5 and a pressurized-regulating region 9 is established via a control valve chamber 18. The control chamber 5 is permanently connected to the control valve chamber 18 via at least one flow-through opening 17 formed in the armature 12. The opening of the control valve 6 causes a pressure drop in the control chamber 5, such that the valve member 3 of the main valve 2 is relieved and the main valve 2 opens. The solenoid circuit is configured in such a way that, in particular when the control valve 6 is open, an opening force acts on the armature 22 of the main valve 2, which assists the opening of the main valve 2. When the main valve 2 is open, a valve chamber 20, into which a gas line 21 opens, is connected to a pressure-regulating region 10 of the main valve 2. The gas line 21 connects the valve chamber 20 to a storage volume of a pressurized gas tank (not shown), such that hydrogen under high pressure from the pressurized gas tank enters the pressure-regulating region 10. This fills the system and equalizes the pressure between the pressure-regulating regions 9, 10, the valve chamber 20, and the control chamber 5. Pressure equalization is achieved on the one hand via a fluidic throttling connection between the control chamber 5 and the valve chamber 20, which in the present case is produced via the guide area 23. On the other hand, the pressure equalization is achieved via the control valve seat 8 of the control valve 6. In this case, the magnetic holding force of the armature 22 of the main valve 2 ensures the main valve 2 is held securely open against the closing spring force of a spring 13.

To close the shut-off valve 1, the solenoid 11 is de-energized so that the spring force of the spring 13 supported on the control valve piston 7 pushes the control valve piston 7 back into the control valve seat 8. At the same time, a pneumatic pressure force acts on the control valve piston 7 in the closing direction, which is caused by a pressure increase in the control chamber 5. The pressure increase is caused by the control chamber 5 filling with gas via the fluidic throttling connection to the valve chamber 20. The pressure increase in the control chamber 5 results in the main valve 2 being able to be closed securely using the spring force of the spring 13.

The invention claimed is:

1. A shut-off valve (1) for hydrogen tank systems, the shut-off valve (1) comprising:
   a main valve (2) having a reciprocally movable valve member (3) which is formed of one or more pieces and interacts at one end with a valve seat (4) and delimits at another end a control chamber (5),
   a control valve (6) having a reciprocally movable control valve piston (7) for opening and closing a housing-side control valve seat (8) via which the control chamber (5) can be connected to at least one pressure-regulating region (9, 10), and
   a solenoid (11) for acting on a first armature (12), which is connected to the control valve piston (7) or forms the control valve piston (7), and a second armature (22), which is connected to the valve member (3) of the main valve (2);
   wherein the control valve piston (7) is biased by a spring force of a spring (13) in a direction of the control valve seat (8), and
   wherein the spring (13) is supported at one end on the valve member (3) of the main valve (2).

2. The shut-off valve (1) according to claim 1,
   wherein the control chamber (5) is fluidically throttling connected to a valve chamber (20) of the main valve (2), wherein a sealing element is provided in a guide area (23) of the valve member (3) of the main valve (2) between the control chamber (5) and the valve chamber (20).

3. The shut-off valve (1) according to claim 2,
   wherein a gas line (21) opens into the valve chamber (20) of the main valve (2), via which the valve chamber (20) can be connected to a storage volume of a pressurized gas tank of the hydrogen tank system.

4. The shut-off valve (1) according to claim 1, wherein the at least one pressure-regulating region (9, 10) includes a pressure-regulating region (9) of the control valve (6) and a pressure regulating region (10) of the main valve (2), wherein the pressure-regulating region (9) of the control valve (6) is connected to the pressure-regulating region (10) of the main valve (2).

5. The shut-off valve (1) according to claim 1,
   wherein the valve member (3) of the main valve (2) is biased by a spring force of a spring (14) in an opening direction.

6. The shut-off valve (1) according to claim 1,
   wherein the valve member (3) of the main valve (2) comprises a first valve member piece (3.1) that interacts with the valve seat (4), and a further valve member piece (3.2) that delimits the control chamber (5).

7. The shut-off valve (1) according to claim 6, wherein the further valve member piece (3.2) is guided via a guide area (23) in a reciprocally moveable manner and/or comprises an annular collar (16) that interacts with a stop (15).

8. The shut-off valve (1) according to claim 1,
   wherein the control valve piston (7) and/or the first armature (12) delimits or delimit the control chamber (5) and wherein a connection between the control chamber (5) and a control valve chamber (18) is established via at least one flow-through opening (17) configured in the control valve piston (7) and/or in the first armature (12).

9. The shut-off valve (1) according to claim 1, wherein the first armature (12) is configured as a flat armature or comprises a portion configured as the flat armature.

10. The shut-off valve (1) according to claim 1, wherein the second armature (22) is configured as a plunger armature or comprises a portion configured as the plunger armature.

11. The shut-off valve (1) according to claim 1, wherein the main valve (2) and the control valve (6) are arranged coaxially and/or accommodated in a common housing (19).

12. A hydrogen tank system comprising at least one pressurized gas tank and a shut-off valve (1) according to claim 1, wherein the shut-off valve (1) is integrated into the pressurized gas tank.

13. The hydrogen tank system according to claim 12, wherein the shut-off valve (1) is integrated into in a cylinder neck of the pressurized gas tank.

14. A shut-off valve (1) for hydrogen tank systems, the shut-off valve (1) comprising:

a main valve (2) having a reciprocally movable valve member (3) which is formed of one or more pieces and interacts at one end with a valve seat (4) and delimits at another end a control chamber (5), a control valve (6) having a reciprocally movable control valve piston (7) for opening and closing a housing-side control valve seat (8) via which the control chamber (5) can be connected to at least one pressure-regulating region (9, 10), and a solenoid (11) for acting on a first armature (12), which is connected to the control valve piston (7) or forms the control valve piston (7), and a second armature (22), which is connected to the valve member (3) of the main valve (2);

wherein the valve member (3) of the main valve (2) is biased by a spring force of a spring (14) in an opening direction.

\* \* \* \* \*